United States Patent Office 3,183,006
Patented May 11, 1965

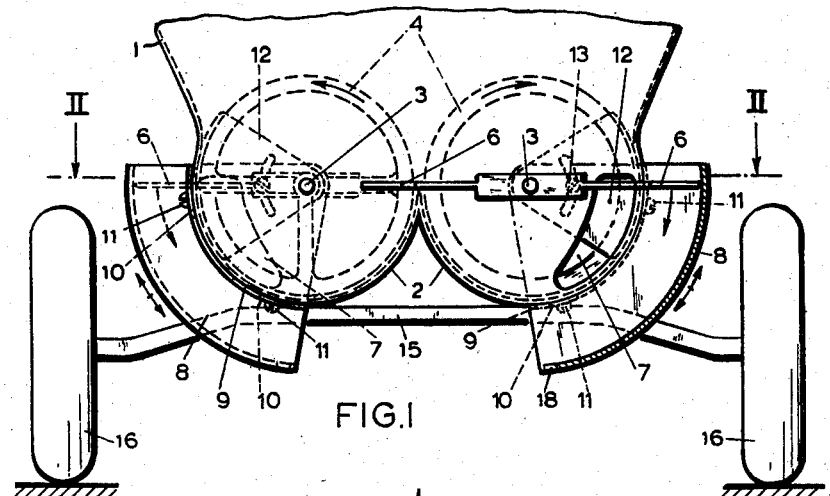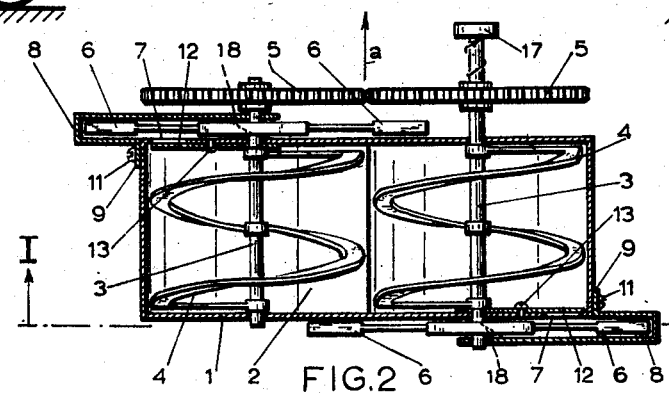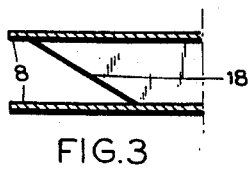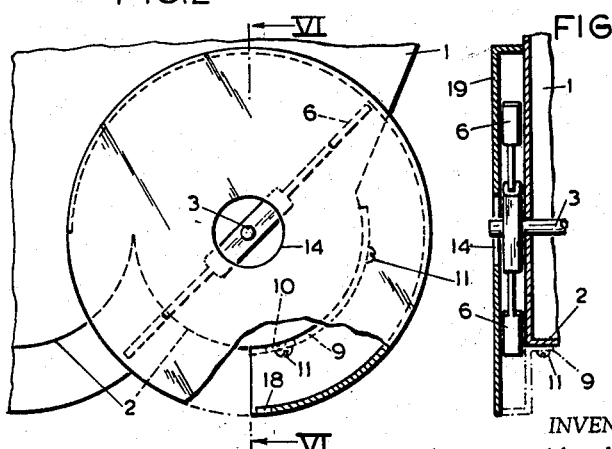

3,183,006
APPARATUS FOR SPREADING OR SOWING GRANULAR OR PULVERIZED MATERIALS
Willem den Herder, Nieuw Vennep, Netherlands, assignor to Landbouwwerktuigen-en Machinefabriek H. Vissers N.V., Nieuw Vennep, Netherlands
Filed May 14, 1963, Ser. No. 280,204
5 Claims. (Cl. 275—8)

This invention relates to an apparatus for spreading or sowing granular or pulverized materials, which is provided with a hopper supported by a travelling frame and from which the material is discharged by two blade wheels, which rotate in opposite directions about axes extending in longitudinal direction of the hopper and said wheels being embraced by a sector-shaped casing.

With an apparatus of this kind the material may be spread on a large width as the blades forcefully throw the material received in the casing from the hopper in lateral directions.

The invention has for its object to improve an apparatus of this kind in such a manner that the lateral distance between the axes of the blade wheels may be reduced so that the width of the apparatus may be smaller. To this end according to the invention the one blade wheel with its casing is mounted at the outer side of the front wall and the other blade wheel with its casing is mounted at the rear wall of the hopper and a discharge opening of the hopper opens in each casing. With said new arrangement is is possible to have the clockwise rotating blade wheel spreading the material to the left and the oppositely rotating blade wheel spreading the material to the right so that also the central part of the track on which the material is spread receives a sufficient quantity. Preferably each casing is adjustably secured to the hopper in such a manner that the discharge end of sector-shaped casing may be displaced substantially in circumferential direction with respect to the blade wheel, so that the quantity of material spread on the central zone of the track may be varied.

The invention will be further described with reference to the accompanying drawing showing an embodiment of the apparatus according to the invention.

In the drawing FIG. 1 is a rear view of the hopper with the blade wheels and their casings, partly in section taken on line I—I of FIG. 2, said latter being a sectional plan view taken on line II—II of FIG. 1.

FIGS. 3 and 4 are details of the discharge end of the circumferential wall of the casing on enlarged scale.

FIGS. 5 and 6 show a modification of the sector-shaped casing in rear view and in vertical section taken on line VI—VI respectively.

The hopper 1 having its longitudinal walls and possibly also its lateral walls converging downwards, is provided with a bottom 2 constituted by two semi-cylindrical walls. Two shafts 3 are supported in the center of said cylindrical walls and each of said shafts carries a helical rib 4 and the shafts rotate in opposite direction and to this end a toothed wheel 5 is secured on each shaft 3. One of said shafts is provided with a coupling element 17 adapted to be coupled with a driving shaft such as the coupling shaft of a tractor not shown in the drawing.

Outside the hopper two or more blades 6 are mounted on each shaft 3 and said blades are adapted to move along a discharge opening 7 provided in the front wall and in the rear wall of the hopper. The blades 6 move through a casing 8 secured to the walls of the hopper 1 and having the shape of a sector of a circle. The casings 8 may be adjusted in circumferential direction and to this end each casing is provided with a flange 9 having slots 10 by means of which the casing is secured to the semi-cylindrical bottom wall 2 of the hopper by screws 11.

The hopper 1 is supported on a frame 15 having ground wheels 16. When the aparatus is travelling on the ground in the direction of the arrow a shown in FIG. 2 the blades 6 provided at the rear wall of the hopper throw the material out of the casing to the left and the blades 6 provided at the front wall of the hopper throw the material to the right, so that the material is spread on a wide track. If desired the material may also be spread laterally to one side only by closing one of the outlet openings 7 by means of a slide valve not shown in the drawing. It will also be possible to disconnect one of the sets of blades 6 from its shaft 3.

The blades 6 are of rectangular shape and the discharge end 18 of the circumferential wall of the casing 8 may be oblique as shown in FIG. 3 or V-shaped according to 18a FIG. 4. The blades 6 need not to be flat as they may also be curved in radial and or axial direction. Further the blades 6 need not to be parallel to the shaft and they may be adjustable in order to have them angled with respect to the axis of the shaft.

At the inner side of the wall of the hopper a slide valve 12 is provided for varying the area of the discharge opening 7 and said slide valve may be locked in its adjusted position by means of a screw 13. If desired also the place of the discharge opening 7 may be varied by providing said opening in an adjustable part of the wall of the hopper.

In order to insure that the pulversized material will be discharged in the desired direction and to prevent it from being spread by the wind the casing 8 may be extended on a larger arc of more than 180° as shown in FIG. 5. The outer wall of the casing 8 in FIGS. 5 and 6 are constituted by a circular plate. The outer wall of the casing may have a central opening 14 for the entrance of air so that the set of blades 6 may operate as an impeller for generating an air flow in the casing which exerts a blowing action on the material to be spread.

What I claim is:

1. An apparatus for spreading or sowing granular or pulverized materials, comprising a hopper supported by a traveling frame having a longitudinal axis in the direction of travel, a pair of blade wheels for discharging material received from said hopper, said wheels each being embraced by a sector shaped casing having a discharge outlet at the bottom, one of said blade wheels with its casing being mounted on the front wall of said hopper and to one side of said longitudinal axis and the other blade wheel with its casing being mounted at the rear wall of the hopper and to the other side of said longitudinal axis, outlet openings in said hopper communicating with said casings, said blade wheels being mounted on longitudinally extending shafts whose axes are laterally spaced to such an extent that the axis of the shaft of one blade wheel lies outside the circle described by the ends of the blades of the other blade wheel but the lateral spacing between said shafts being smaller than the diameter of said circle, and means for rotating said blade wheels in opposite directions so that the right blade wheel as viewed in the travelling direction rotates in a clockwise direction and the material to be spread is thrown to the left through its discharge outlet while the other blade wheel rotates counterclockwise and spreads the material to the right.

2. An apparatus as claimed in claim 1, wherein the lower edge of the discharge outlet of each casing embracing a blade wheel is oblique with respect to the axis of the blade wheel.

3. An apparatus as claimed in claim 1, wherein each casing is open at the top and movably mounted for adjustment in the circumferential direction of its blade wheel, and means is provided for fixing each casing in an adjusted position.

4. An apparatus as claimed in claim 1, wherein the wall of each casing remote from the hopper is provided with a central opening for drawing in air.

5. An apparatus as claimed in claim 4, wherein said central opening in the wall of each casing has a diameter smaller than the diameter of the blade wheel at the feet of the blades.

References Cited by the Examiner
UNITED STATES PATENTS

| | | | |
|---|---|---|---|
| 2,487,552 | 11/49 | Humphrey | 275—2 |
| 2,738,195 | 3/56 | Underwood | 275—8 |
| 2,738,196 | 3/56 | Underwood | 275—8 |
| 2,907,482 | 10/59 | Smith | 275—8 X |

ABRAHAM G. STONE, *Primary Examiner.*